US012629641B2

(12) United States Patent
Maher et al.

(10) Patent No.: US 12,629,641 B2
(45) Date of Patent: May 19, 2026

(54) SINGLE USE FLEXIBLE SPARGER

(71) Applicant: EMD Millipore Corporation, Burlington, MA (US)

(72) Inventors: Marisa Maher, Somerville, MA (US); Stefano Berti Perez, Boston, MA (US); Anne Hansen, North Reading, MA (US); Noah Rhein, Maynard, MA (US); Amy Mei, Medford, MA (US); Sualyneth Galarza, Brighton, MA (US); John Caulmare, Beverly, MA (US); Joseph W. Muldoon, Berlin, MA (US); Amy Wood, Concord, MA (US)

(73) Assignee: EMD MILLIPORE CORPORATION, Burlington, MA (US)

( * ) Notice: Subject to any disclaimer, the term of this patent is extended or adjusted under 35 U.S.C. 154(b) by 179 days.

(21) Appl. No.: 18/552,525

(22) PCT Filed: Apr. 14, 2022

(86) PCT No.: PCT/US2022/024843
§ 371 (c)(1),
(2) Date: Sep. 26, 2023

(87) PCT Pub. No.: WO2022/221549
PCT Pub. Date: Oct. 20, 2022

(65) Prior Publication Data

US 2024/0042398 A1 Feb. 8, 2024

Related U.S. Application Data

(60) Provisional application No. 63/175,696, filed on Apr. 16, 2021.

(51) Int. Cl.
*B01F 23/231* (2022.01)
*B01F 35/513* (2022.01)
*B01F 101/44* (2022.01)

(52) U.S. Cl.
CPC ................ *B01F 23/231241* (2022.01); *B01F 23/231151* (2022.01); *B01F 23/23125* (2022.01);
(Continued)

(58) Field of Classification Search
CPC ........ B01F 23/231241; B01F 23/23125; B01F 23/231264; B01F 23/231151;
(Continued)

(56) References Cited

U.S. PATENT DOCUMENTS

| | | | |
|---|---|---|---|
| 6,436,193 B1 | 8/2002 | Kasai et al. | |
| 8,833,743 B2 * | 9/2014 | Ko | B01F 23/23123 261/126 |

(Continued)

FOREIGN PATENT DOCUMENTS

| | | |
|---|---|---|
| CN | 108467109 A | 8/2018 |
| DE | 102009052670 A1 * | 5/2011 |

(Continued)

OTHER PUBLICATIONS

Partial English Machine Translation of DE 102009052670 A1 (Year: 2011).*

(Continued)

*Primary Examiner* — Charles S Bushey
(74) *Attorney, Agent, or Firm* — EMD MILLIPORE CORPORATION

(57) ABSTRACT

A multi-layered flexible sparger (100) that has a bottom film layer (102), a middle film layer (106), and a top film layer (110); a first inner mesh (104) disposed between the bottom film layer and the middle film layer: a second inner mesh (114) disposed between the middle film layer and the top film layer; and a port capable of delivering a gas to the multi-layered flexible sparger disposed between the top film layer and the bottom film layer, wherein the middle film (Continued)

layer includes drill holes and the top film layer includes drill holes.

20 Claims, 10 Drawing Sheets

(52) U.S. Cl.
CPC .... *B01F 23/231264* (2022.01); *B01F 35/513* (2022.01); *B01F 2101/44* (2022.01)

(58) Field of Classification Search
CPC ..... B01F 35/513; B01F 2101/44; C12M 1/04; C12M 23/24; C12M 23/28; C12M 29/06
USPC ........................................................ 261/122.1
See application file for complete search history.

(56) References Cited

U.S. PATENT DOCUMENTS

| | | | | |
|---|---|---|---|---|
| 9,643,133 | B2 * | 5/2017 | Goodwin | C12M 29/06 |
| 2010/0133709 | A1 | 6/2010 | Hu et al. | |
| 2011/0304063 | A1 | 12/2011 | Ko et al. | |
| 2013/0082410 | A1 | 4/2013 | Goodwin et al. | |
| 2016/0244710 | A1 | 8/2016 | Wood et al. | |
| 2019/0218496 | A1 | 7/2019 | Brau et al. | |
| 2019/0374910 | A1 | 12/2019 | Zhang | |

FOREIGN PATENT DOCUMENTS

| | | | | |
|---|---|---|---|---|
| GB | 2319189 | A | * | 5/1998 |
| JP | 2014-534808 | A | | 12/2014 |
| KR | 10-2016-0043113 | A | | 4/2016 |
| WO | 2012/063995 | A1 | | 5/2012 |
| WO | 2020/101848 | A1 | | 5/2020 |

OTHER PUBLICATIONS

International Search Report and Written Opinion received for PCT Application No. PCT/US2022/024843, mailing date Sep. 12, 2022, 11 Pages.

* cited by examiner

400

SINGLE USE FLEXIBLE SPARGER

RELATED APPLICATIONS

The present application is a U.S. National Stage application of International Application No. PCT/US2022/024843, filed Apr. 14, 2022 which claims the benefit of U.S. Provisional Patent Application No. 63/175,696, filed on Apr. 16, 2021, the entire contents of which is incorporated by reference herein in its entirety.

FIELD

Embodiments disclosed herein relate to devices for the bioprocessing of biological fluids. More particularly, the devices include aeration devices for use within a container or vessel, such as a bioreactor, e.g., single use stirred tank bioreactors having volumes between 50-5000 liters.

BACKGROUND

Traditionally, fluids such as biological materials have been processed in systems that utilize stainless steel containers or vessels. These containers are sterilized after use so that they can be reused. The sterilization procedures are expensive and cumbersome, as well as being ineffectual at times. In order to provide greater flexibility in manufacturing and reduce the time needed to effect a valid regeneration of the equipment, manufacturers have begun to utilize disposable sterilized containers and/or bioreactors such as collapsible bags, which are used once and subsequently disposed. An example of use of these disposable or single-use bags is in a system for mixing two or more ingredients, at least one of which is liquid and the other(s) being liquid or solid, and the bag has a mixing element or the like for causing the contents to mix as uniformly as possible. An example of a disposable container is a bioreactor or fermenter bag in which cells are either in suspension or on microcarriers and the container has a mixing system for circulating the liquid, gases, and in some cases the cells within the interior of the container.

Many conventional mixing bags, which typically range in size from three (3) Liter to smaller and fifty (50) liter or larger, i.e., 5000 liter, are shaped like cylinders, with the bottom of the bag optionally forming a cone, to mimic the shape of stainless-steel tanks that the disposable bags are replacing. Cylindrical shaped bioreactors allow the contents of the bag to be mixed in an efficient manner. Typically, the bag contains a mixer for mixing or circulating the contents, such as a magnetically coupled impeller contained within the bag and a magnetic motor outside the bag, which remotely causes the impeller to rotate. The containers also can contain one or more aeration devices, e.g., gas spargers, through which gas bubbles are introduced into the container contents. The contents are typically biopharmaceutical or other biological fluids. Such fluids typically comprise cell culture media and adjuvants. The containers contain gases, such as air, oxygen, carbon dioxide, nitrogen, etc. Spargers for use with 50-5000 liter bioreactors have air supplied through the bottom of the bioreactor. Because of the pressure of 50-5000 liters of fluid, spargers must have check valves or use high pressures to create the back pressure necessary to prevent liquids from back flowing into the sparger during aeration.

Aeration of biological fluids within bioreactors is common to support cell culture oxygenation via sparing devices. However, the use of high gas flow rates used to achieve high levels of oxygenation, measured as kLa, can result in high speeds and very small bubbles, which can cause cell shear and induce cell death; wherein kLa is a gas transfer coefficient, e.g., a measurement of the capacity of the bioreactor to transfer oxygen into the culture. High speeds and small bubbles can result in undesirable bioprocess product losses or changes in product quality, yet, a high kLa is requisite to achieving high cell density, for example in perfusion processes. Hence distribution of gas flow can be achieved to maximize gas transfer to achieve a high kLa by using sparging, suitable for specific flow requirements.

Past attempts for sparging devices include drilled hole spargers, which were created from a film or a mold. These devices aimed to control the bubble size and/or the exit gas velocity of air. However, for film spargers the flexibility of the film material resulted in a lack of a controlled pressure gradient across the sparger area, resulting in lower oxygen transfer, wider distribution of bubble sizes and leakage. Molded devices are expensive and bulky, may occupy significant space inside single use bioreactors, and damage the interior of bioreactors during transit. Another prior art flexible sparger, comprising two film layers lacked an even distribution of air, i.e., the air flow goes out the highest point of the sparger and did not distribute air to the entire area of sparger, e.g., in discrete pockets only.

As noted above, bubble size of aerated gases is important. In bioreactor applications, for example, a balance exists for managing bubble number and sizes such that mass transfer from the gas-liquid phase or vice versa is sufficient for the process while preventing negative culture effects such as significant shear or foaming. Generally, smaller bubble sizes are more efficient in transferring gas from the bubble to the liquid or biological fluid, due to an increased surface area. However, the smaller the bubble, the greater the potential damage to cells as compared to larger bubble sizes due to their similar size to cells and their potential to promote accumulation of foam on the liquid surface. Similarly, creating and maintaining a generally homogenous environment for the contents of the container, such as cells in culture, is also important in bioreactor/bioprocessing operations. It is undesirable to have regions and/or gradients, i.e., differences in mixing (pH, nutrients, and dissolved gases), shear, temperature, etc., within bioreactors. Some cell culture processes may require the highest possible mass transfer capabilities while others may require specific bubble sizes that are large enough so that sensitive cells are unharmed. To date, there was no sparging device suitable for balancing bubble sizes with shear and foam generation.

It is therefore an advance to provide a container or bioreactor, such as a disposable or single-use container or bioreactor for biological fluids, wherein a sparging device(s) aid in optimal cell culture growth performance and viability by providing sparging devices that are small, flexible, and can balance the competing aspects of bubble size, shearing, foaming, air distribution, and other bioprocessing conditions.

SUMMARY

Embodiments of a multi-layered drilled hole flexible sparger comprising three film layers and two mesh layers, substantially as shown in and/or described in connection with at least one of the figures, as set forth more completely in the claims, are disclosed. Novel and inventive features of the present disclosure, as well as details of exemplary embodiments thereof, will be more fully understood from the following description and drawings. Some embodiments of the disclosure include a multi-layered flexible sparger that has a bottom film layer, a middle film layer, and a top film layer; a first inner mesh disposed between the bottom film layer and the middle film layer; a second inner mesh disposed between the middle film layer and the top film layer; and a port capable of delivering a gas to the multi-layered flexible sparger disposed between the top film layer and the bottom film layer, wherein the middle film layer comprises drill holes and the top film layer comprises drill holes. Some embodiments of the disclosure include a multi-zone, multi-layered, flexible sparger having a bottom film layer, a middle film layer, and a top film layer; a first inner mesh disposed between and bonded to the bottom film layer and the middle film layer; a second inner mesh disposed between and bonded to the middle film layer and the top film layer; and a port capable of delivering a gas to at least two sparging zones within the multi-zone, multi-layered flexible sparger disposed between the top film layer and the bottom film layer, wherein the middle film layer comprises drill holes and the top film layer comprises drill holes.

In some embodiments, the multi-layered flexible drilled hole sparger is a single-use sparger. Some embodiments comprise wherein the middle film layer contains a low number of small drilled holes that resists air flow and creates back pressure between the middle and bottom film layers. A middle layer having a low number, for example, between 1% and 50% as many drilled holes and/or smaller drilled holes compared with the top layer. In some embodiments, the middle layer comprises between 5-25% as many holes as the top layer. In some embodiments, the middle layer comprises between 10-20% as many holes as the top layer. Also, for example, drilled holes having a diameter of between 5 and 1000 microns, promotes back pressure and gas distribution over the middle layer. Embodiments of the disclosure include a middle film layer having a number and size of drilled holes that resists air flow and creates back pressure between the middle and bottom film layers. Also, for example, drilled holes having a diameter of between 5 and 1000 microns, promotes back pressure and gas distribution over the middle layer. The top film layer contains drilled holes designed for a specific exit gas velocity and bubble size. A layer of mesh exists between the top film layer and the middle film layer to provide support for the film and physical separation of film layers for air flow to distribute across the sparging area.

The top film layer contains drilled holes designed for a specific exit gas velocity and bubble size. A layer of mesh exists between the top film layer and the middle film layer to provide support for the film and physical separation of film layers for air flow to distribute across the sparging area. The top and middle film layers are bonded into sections that restricts air flow to specific areas regardless of sparger orientation. The at least three film layers are bonded around the perimeter of the sparger and at an area in the center of the sparger. Embodiments of the spargers disclosed herein demonstrate substantially equal distribution of the gas flow rate throughout the sparger regardless of sparger orientation. Embodiments of the spargers disclosed herein provide uniform bubble size independent of gas flow rate. Embodiments of the spargers disclosed herein advance the art because the sparger designs herein widen optimal performance windows, offer high kLa for increased cell density, ease of manufacturing, and flexibility for ease of integration within existing bioreactors and containers. Some embodiments include the use of multiple spargers within one bioreactor. Some embodiments include means for switching between spargers having differing pore sizes and/or kLa characteristics. Such means comprise optimizing and varying gas flow ranges using manifolds and control schemes controlled by microprocessor-controlled bioreactors and mass-flow controllers. In some embodiments, desired kLa characteristics are achieved using the microprocessor-controlled bioreactors and mass flow controllers and further combined with multiple spargers capable of producing differing bubble sizes. These advances and others embodied herein will become clear from the description, claims, and figures below. Various benefits, aspects, novel and inventive features of the present disclosure, as well as details of exemplary embodiments thereof, will be more fully understood from the following description and drawings. So, the manner in which the features disclosed herein can be understood in detail, more particular descriptions of the embodiments of the disclosure, briefly summarized above, may be had by reference to the appended drawings. It is to be noted, however, that the appended drawings illustrate only typical embodiments of this disclosure and are therefore not to be considered limiting of its scope, for the described embodiments may admit to other equally effective bags, biocontainers, films, and/or materials. It is also to be understood that elements and features of one embodiment may be found in other embodiments without further recitation and that, where possible, identical reference numerals have been used to indicate comparable elements that are common to the figures. As used herein, the singular forms "a," "an," and "the" include plural referents unless the context clearly dictates otherwise. Unless defined otherwise, all technical and scientific terms used herein have the same meaning as commonly understood by one of ordinary skill in the art to which these embodiments pertain.

BRIEF DESCRIPTIONS OF THE DRAWINGS

Figure 13:
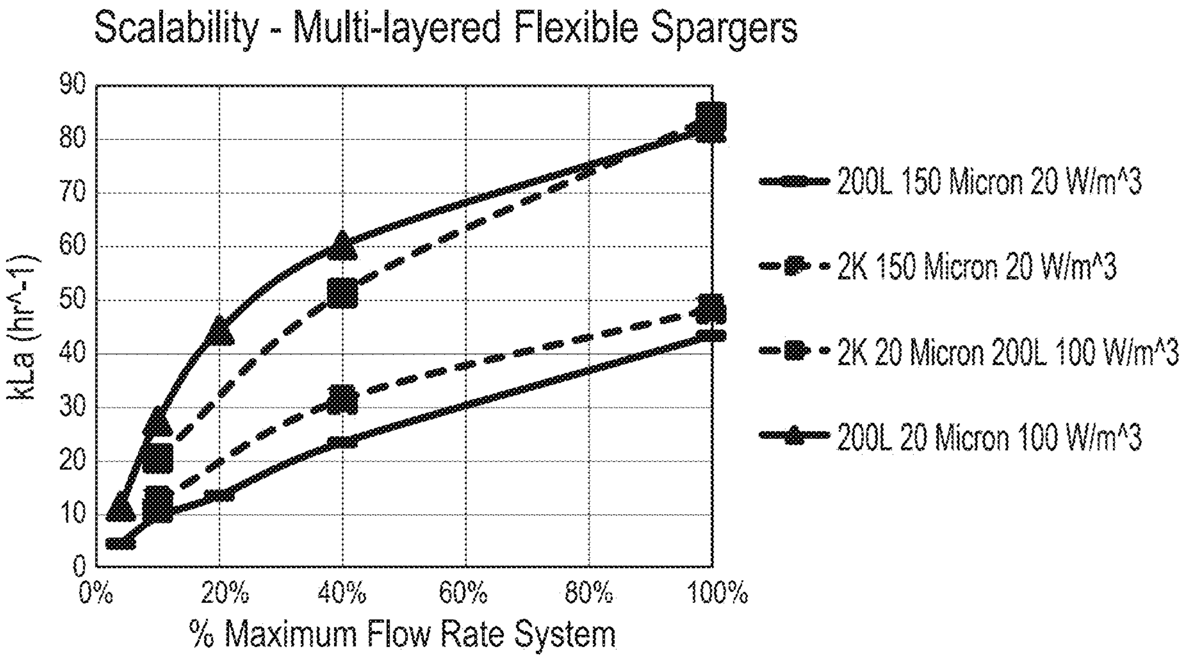
Figure 14:
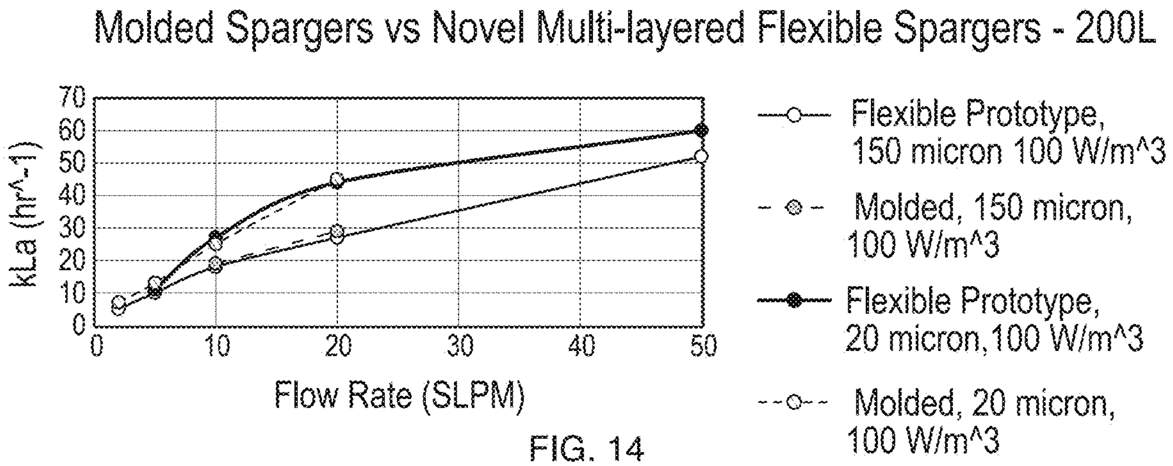

FIG. 13 depicts a graph of the comparative data of scalability for flexible spargers for 200-liter and 2000-liter bioreactors, according to embodiments of the disclosure FIG. 14 depicts a graph of the comparative data for novel multi-layered flexible spargers, according to embodiments of the disclosure herein, versus molded spargers, wherein a flow rate (standard liters per minute (SLPM)) is plotted against kLa in a 200 L bioreactor, according to embodiments of the disclosure herein.

Figure 15:
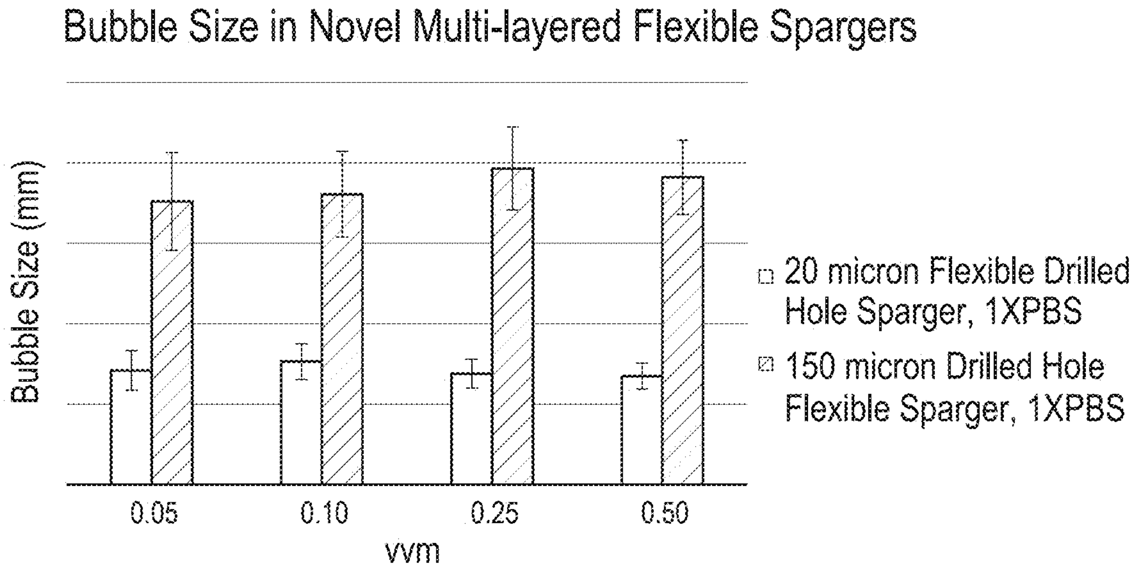

FIG. 15 depicts a graph of the flexible prototype bubble size for two different sized drilled holes at various flow rates, according to embodiments of the disclosure herein.

Figure 16:
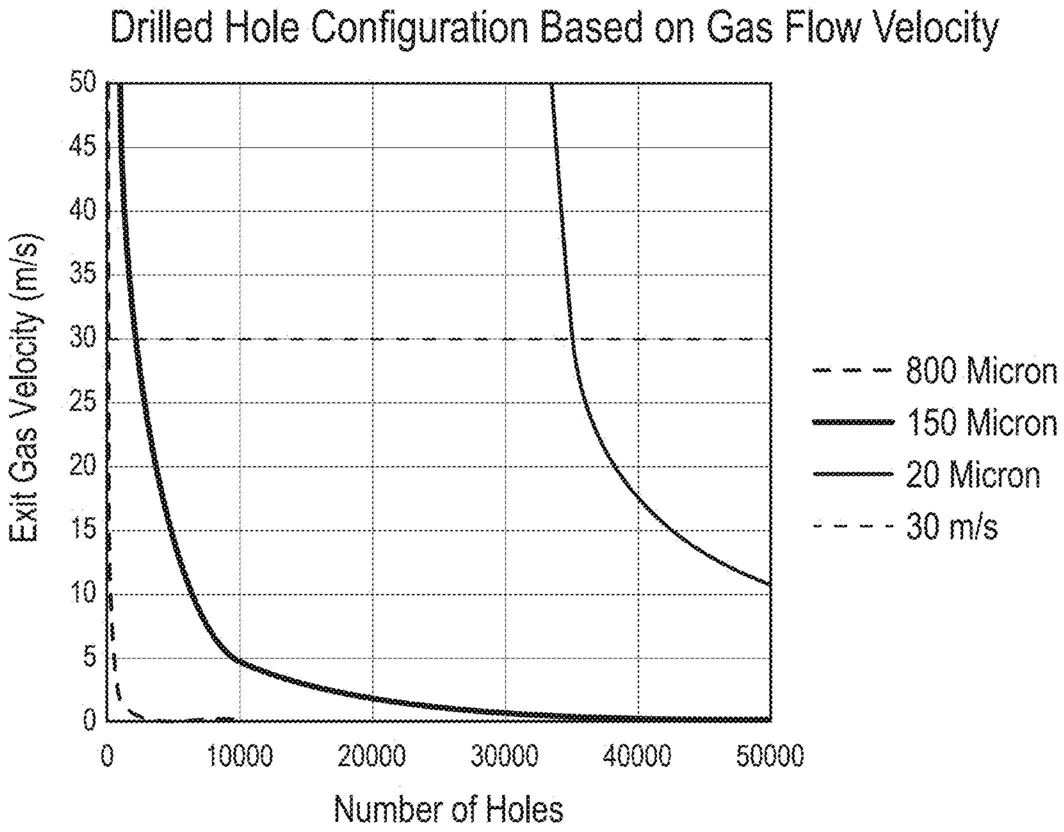

FIG. 16 depicts a graph that is used for selecting a number of holes (from 0 to 8000 holes) for a flexible sparger design based off of a velocity limit for air flow of 30 m/s for various hole sizes ranging from 10-800 microns, according to embodiments of the disclosure herein.

Figure 17:
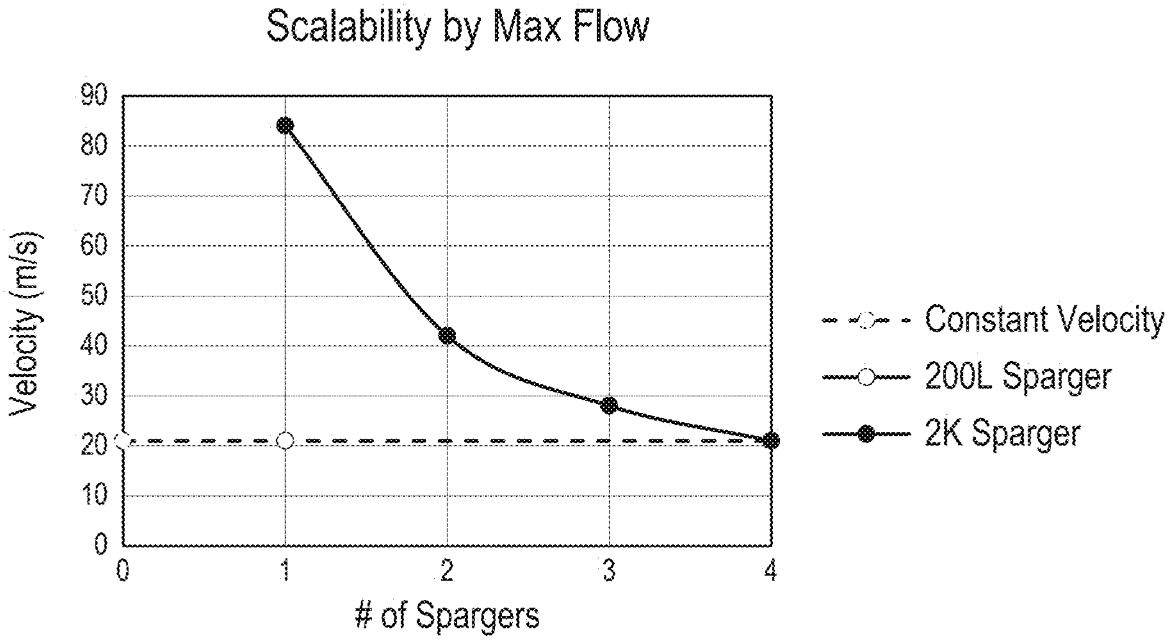

FIG. 17 depicts a graph that is used for specifying the number of spargers that may be used for a 200 L bioreactor and a 2000 L bioreactor at specified air flow velocities, according to embodiments of the disclosure herein.

DETAILED DESCRIPTIONS OF SOME EMBODIMENTS

The term film within the meaning of this disclosure means any flexible material that is capable of being fused with another flexible film, including, but not limited to, polymeric sheet, composites, laminates, single-layer, and/or multi-layer polymeric materials. These films may further comprise substrates, which may comprise plastics netting, wovens, non-wovens, knits, and/or metallic foils and other flexible structures and materials. The films may comprise, for example, a polyolefinic material, e.g., low density polyethylene, linear low-density polyethylene, middle density polyethylene, high density polyethylene, ultra-high density polyethylene, polypropylene, and other polyolefins. In some embodiments, the flexible films comprise a laminate film structure with a lower melting point material internal to an external higher melting point polymer. Also, in some embodiments, the flexible films comprise a laminate film structure with a lower melting point material surrounding a higher melting point woven, knit, or non-woven material. In some embodiments, any or all of the bottom film, middle film, or the top film comprise any of the films as described in WO Publication WO2020101848A1, which is incorporated by reference in its entirety. In some embodiments, one or more of these films is/are substantially similar to a PUREFLEX®, PUREFLEX PLUS® or ULTIMUS® film as marketed by EMD Millipore Corporation, Burlington, MA, USA. The films herein discussed may be multi-layered films comprising one or more layers of polyethylenes, ethylene vinyl acetates, ethyl vinyl alcohol, and other materials. In some embodiments, any or all of the bottom film, middle film and/or top film comprise a substrate that is netting, wovens, non-wovens, knits, and other structures that are, for example, made of nylons, polyamides, and other abrasion resistant materials, wherein various tie layers, e.g., polyurethanes, may be disposed between layers.

The term biocontainer is defined broadly as any flexible container or vessel capable of holding a fluid within an internal volume or region, and may be in the form of a two-dimensional, three-dimensional, and/or multi-faceted bag or bioreactor. In some embodiments, the biocontainer or bioreactor has a baffle incorporated therein, wherein the baffle is capable of disrupting a vortex within a liquid formed when a mixer, such as an impeller, mixes the liquid.

Figure 1:
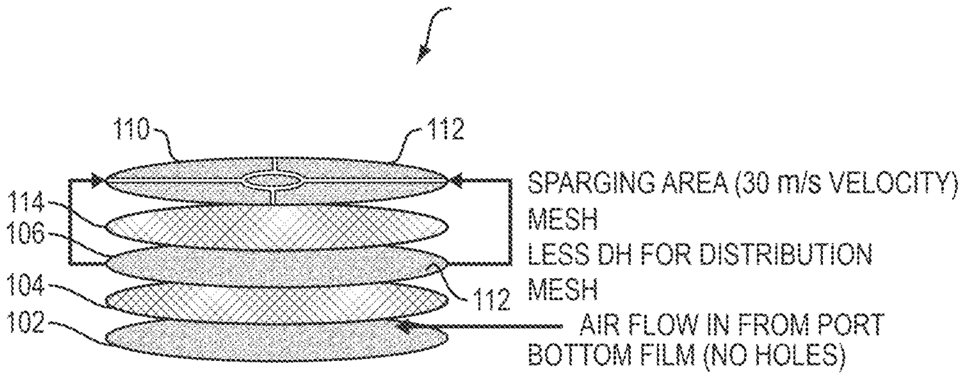
FIG. 1 depicts a side exploded perspective view of a multi-layered flexible sparger, according to some embodiments of the disclosure.

FIG. 1 depicts a side exploded perspective view of a multi-layered flexible sparger 100, according to some embodiments of the disclosure. As depicted in FIG. 1, the multilayer flexible sparger comprises a bottom film layer 102, having no sparging holes, which acts as a supporting base, and a first inner mesh 104 is disposed adjacent to the bottom film layer 102. The first inner mesh 104 supports the bottom film layer 102 and is a means for distributing air flow across a sparging area (discussed below in greater detail). In some embodiments, the first inner mesh 104 distributes air flow across an entire sparging area. The multi-layered flexible sparger further comprises a second film 106 that is disposed between the bottom film layer 102 and a top film layer 110, the top film layer 110 having a number of drilled holes 112. In other words, the second film layer 106 is a middle film layer. The middle film layer 106 also comprises a number of drilled holes 112 in a number that, in some embodiments, is generally fewer than the number of drilled holes 112 in the top film layer 110. In some embodiments, there are approximately between 10 to 50,000 drilled holes in both of the middle film layer 106 or top film layer 110. In some exemplary embodiments, the middle film layer 106 comprises between 20 to 200 drilled holes. In some exemplary embodiments, the top film layer 110 comprises between 1000 to 36,000 drilled holes. It is to be understood that the drilled holes may be formed by any suitable process, such as the use of a porogen or various lasers. Because the middle film layer 106 comprises fewer drilled holes 112, the middle layer 106 is capable of creating a back pressure of air flow. The back pressure promotes a uniform distribution of gas or air flow across a sparging area. In some embodiments, the flexible sparger 100 comprises a second inner mesh 114, which is disposed between the middle film layer 106 and the top film layer 110. The thicknesses of the first inner mesh 104 and the second inner mesh 114 may also be varied to affect the sparging performance. Without intending to be limited by theory, it is thought that a thicker mesh may keep the bottom film layer 102 and the middle film layer 106 further apart, resulting in better sparging performance. For example, it is thought that a thicker mesh promotes an even air flow distribution. Similarly, it is thought that a thicker mesh may keep the middle film layer 106 and the top film layer 110 further apart, resulting in better sparging performance. In some embodiments, the top film layer 110 comprises drilled holes 112 designed for at one specific exit gas velocity and bubble size. It is also thought that drilled holes 112 in film layers provide enhanced consistency over non-woven structures or membrane structures within spargers, providing constant and predictable bubble sizes. In some embodiments, the middle 106 and top film layers 110 are bonded in sections to restrict gas flow to specific areas. All three film layers, i.e., the bottom film layer 102, the middle film layer 106, and the top film layer 110 are bonded at a perimeter and at a center of the flexible sparger. The multi-layered flexible sparger 100 further allows vertical gas flow into a bioreactor regardless of the orientation in which the multilayer flexible sparger 100 is within a bioreactor (not shown). In other words, the gas or air flow remains uniform across the flexible sparger irrespective of orientation. In yet some other embodiments, the flexible sparger 100 has no middle film layer 106. In other words, a multi-layered flexible sparger 100 comprises a bottom film layer 102, a top film layer 110 having drill holes 112, and a mesh 114 disposed therebetween. In some embodiments, the drilled holes 112 in the middle film layer 106 range in size from 10 microns to 800 microns in diameter. In some embodiments, the drilled holes 112 in the top film layer 110 range from 10 microns to 800 microns in diameter. In some embodiments, the drilled holes 112 in the top film layer 110 are less than 100 microns in diameter. All embodiments of the flexible sparger herein comprise a port for supplying air or another gas into the flexible sparger. The port may be disposed on top (such as in a center of the top film layer) of the flexible sparger, on the bottom (such as in a center of the bottom film layer) of the flexible sparger, or on a side of the flexible sparger. The flexible sparger may comprise a substantially circular shape or, for example, a substantially circular shape having a flange adjacent to a circularly shaped area (e.g., a whoopie cushion). In some embodiments, the port supplies air or a gas to the flexible sparger via the flange.

Figure 2:
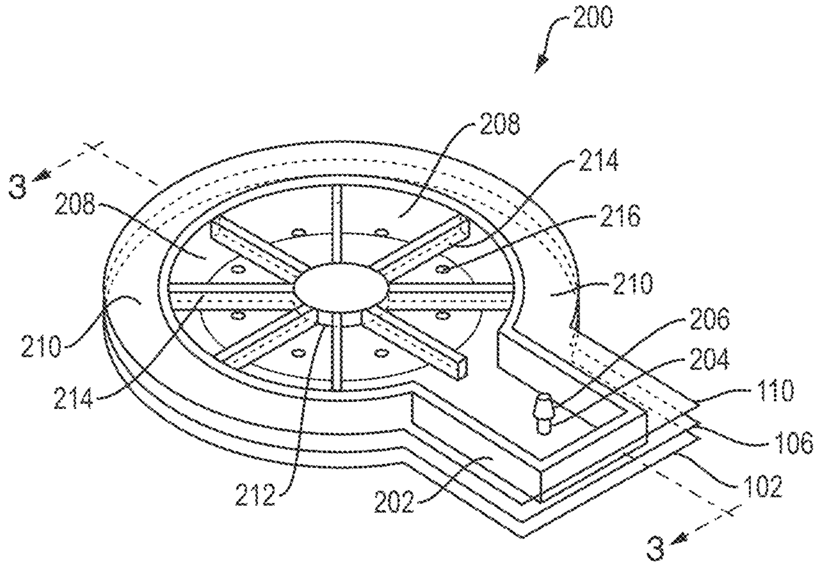
FIG. 2 depicts a top perspective view of a multi-layered flexible sparger having a flange, according to some embodiments of the disclosure.

FIG. 2 depicts a top perspective view of a flexible sparger 200 having a flange 202, according to some embodiments of the disclosure. The flexible sparger 200 is substantially circular while the flange 202 may be of any suitable shape. As depicted, the flange 202 is rectangularly shaped. The flange 202 comprises a port 204, which projects from an upper portion of the flange 202. In some embodiments, the port 204 may project from a lower portion of the flange 202. The port 204, when connected to a gas supply, such as air or oxygen, delivers air into the flexible sparger 200. In some embodiments, the port 204 comprises a connector, such as a barb 206 for connection with a tube (not shown), a connector, or a sterile connector. In some embodiments, the port 204 is connected to the middle film layer 106 and/or the top film layer 110.

In some embodiments, the first and/or second inner mesh comprise a woven or extruded mesh, embossed and/or apertured film, or a membrane having a low open area (areas open to gas flow) as a middle layer to create back pressure, such that air is distributed through all openings on the middle layer. In some embodiments, flow pockets are created by means of sealing layers of film together, wherein air or gas flow is directed to specific areas of the flexible sparger, achieving a substantially even distribution of gas flow within the flexible sparger, resulting in consistent bubble size and bubble velocity across a surface of the flexible sparger regardless of sparger orientation angle, gas flow rate, or a head pressure. For example, the flexible sparger 200 further comprises flow pockets 208. As shown, there are eight flow pockets 208. The flow pockets 208 are formed by bonds, such as can be made by ultrasonic welding, heat welding, adhesives, etc., and other methods for joining plastics films as is known to those in the art. In some embodiments, bonds are formed using high frequency/radio frequency (RF) bonding. In some embodiments, the RF bonding process is a two-step RF bonding process. In some embodiments, the RF bonding process is a three-step RF bonding process. RF welding is the placement of plastics materials between two opposing metallic plates. Pressure is applied to the plates, and therefore onto the plastics, while RF waves are sent through the plates, creating heat that fuses the plastics together. A bond 210 is made just inside of the perimeter of the flexible sparger 200. A central bond 212 is made in the center, wherein all layers are bonded together. And eight radial legs 214 projecting from the central bond 212 and the perimeter bond 210. The perimeter bond 210 is made through that is inclusive of the bottom film layer 102, the middle film layer 106, and the top film layer 110. The flow pockets 208 are formed by sealing the top film layer 110 and the middle film layer 106. Optionally, a spot bond 216 is made in each flow pocket 208 by bonding the middle layer 106 with the second inner mesh 114.

Figure 3:
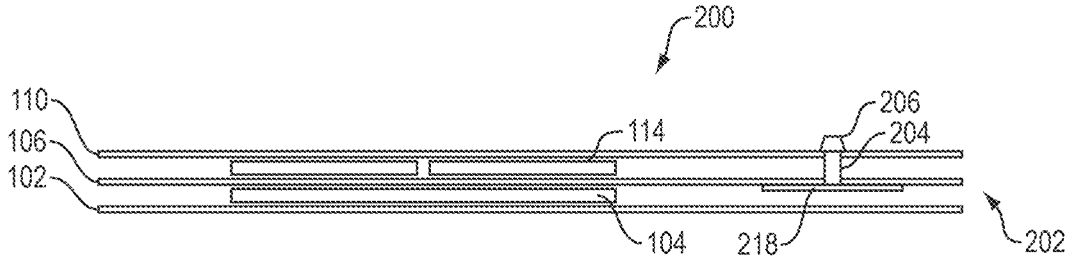
FIG. 3 depicts a side view of the multi-layered flexible sparger of FIG. 2, according to some embodiments of the disclosure.

FIG. 3 depicts an exploded side view cross-section of the multi-layered flexible sparger 200 of FIG. 2, according to some embodiments of the disclosure. As shown, a bottom film layer 102, a middle film layer 106, and a top film layer 110 are present in the multi-layered flexible sparger 200. The port 204 is depicted as being incorporated into the flange. The port 204 is a barb-style 206 port and comprises a shoulder 218 for attachment to the middle film layer 106 and the top film layer 110. Because the port 204 projects between the middle film layer 106 and the bottom film layer 102, air or another gas is supplied therebetween as well. The first inner mesh 104 and second inner mesh 114 are also shown. In some embodiments, as shown, the first inner mesh 104 and second inner mesh 114 are smaller than a diameter of the flexible sparger 200 so that bottom film layer 102, middle film layer 106 and top film layer 110 can be bonded at the perimeter bond 210. In some embodiments, the first inner mesh 104 and second inner mesh 114 are essentially the same diameter and therefore become part of the perimeter bond 210 (not shown in FIG. 3).

Figure 4:
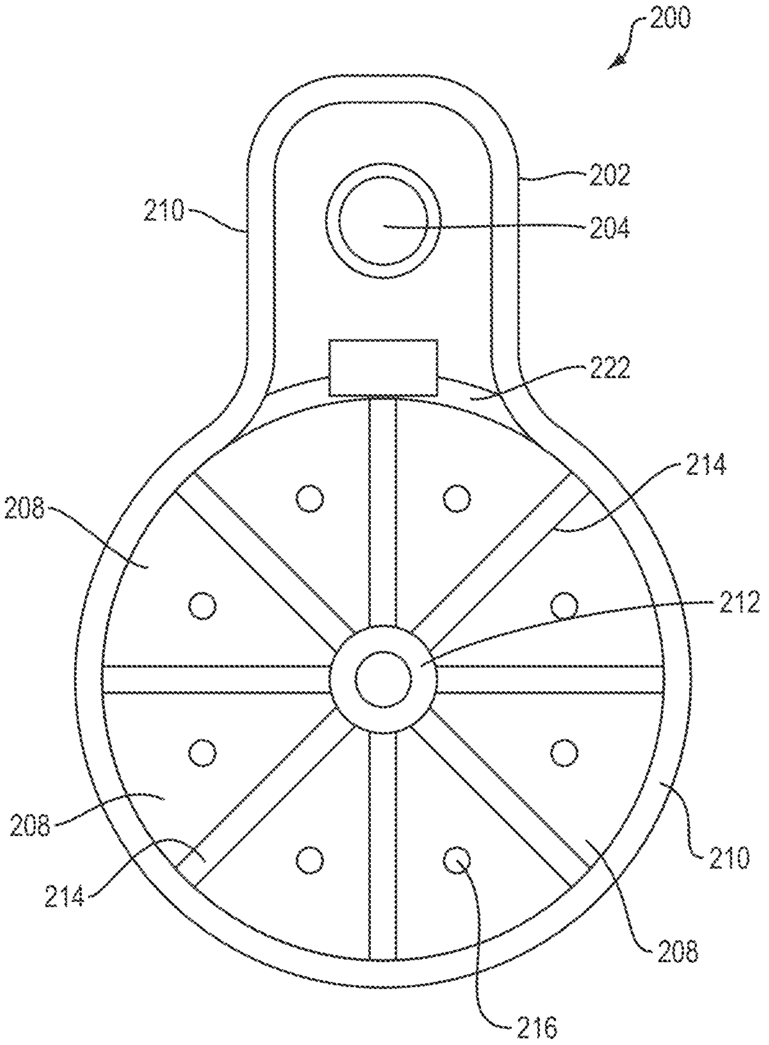
FIG. 4 depicts a top view of the multi-layered flexible sparger of FIG. 2, according to some embodiments of the disclosure.

FIG. 4 depicts a top view of the multi-layered flexible sparger 200 of FIG. 2, according to some embodiments of the disclosure. The top view depicts the multi-layered flexible sparger 200 having the radial legs 214 in each of the eight flow pockets 208 and around the perimeter bond 210 of an outer border and of a central bond 212 area. The spot bonds 216 are shown, one each for each flow pocket 208. The port 204 is shown in the flange 202. A bond 222 is also shown, which is between the top film layer 110 and the middle film layer 106 and completes two of the flow pockets 208. An optional bond disposed between two opposing sides of the bond 222, which further supports the multi-layered flexible sparger 100, 200 in some embodiments.

Figure 6:
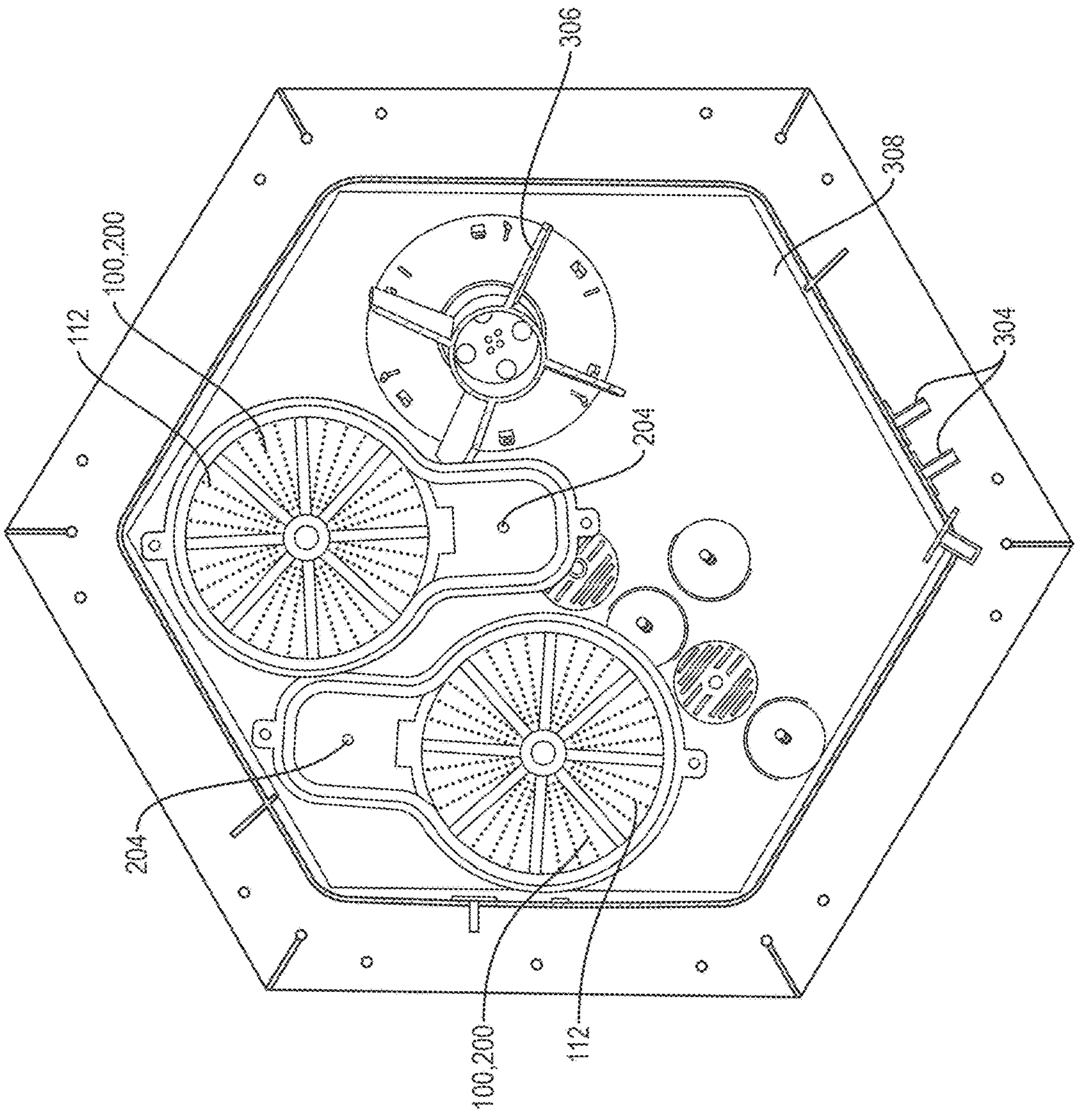
FIG. 6 depicts a close up top view of the bottom, internal surface of the bioreactor taken along line 6-6 in FIG. 5, showing two multi-layered flexible spargers and an impeller, according to some embodiments of the disclosure.
Figure 5:
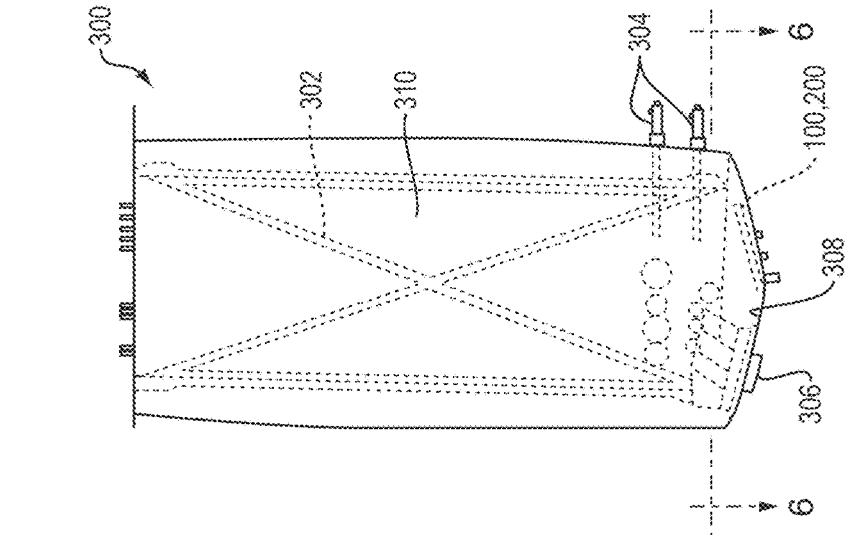
FIG. 5 depicts a side view of a multi-layered flexible sparger disposed within a bioreactor, according to some embodiments of the disclosure.

FIG. 5 depicts a side view of a flexible sparger, such as the multi-layered flexible sparger 200 of FIG. 2, disposed within a bioreactor 300, according to some embodiments of the disclosure. Some embodiments of the disclosure comprise a bioreactor system having a bioreactor and a multi-layered flexible sparger 100, 200 as discussed above. The multi-layered flexible sparger 100, 200 may be disposed on a bottom, internal surface of the bioreactor 300. Also, the multi-layered flexible sparger 100, 200 may be disposed on a bottom, internal surface 308 of the bioreactor 300 in a geometric center of the bioreactor or off-center (as shown). In some embodiments, the multi-layered flexible sparger 100, 200 is attached to the bottom, internal surface 308 of the bioreactor 300 or is free-floating within the bioreactor 300. In some embodiments, a plurality of multi-layered spargers 100, 200 is disposed within the bioreactor 300. For example, between two (as shown in FIG. 6) and eight multi-layered spargers. Any of the bioreactors described herein, such as bioreactor 300, may have a working volume 310 of between 50 liters and 3000 liters. In some embodiments, the working volume 310 of the bioreactor 300 is between 200 liters and 2000 liters. As shown, the bioreactor 300 further comprises ports 304 for delivering or removing gases or liquids from the working volume 310. A baffle 302 is shown. An impeller 306 for mixing liquids within the working volume 310 is also shown.

FIG. 6 depicts a close up top view of the bottom, internal surface 308 of the bioreactor 300 taken along line 6-6 in FIG. 5, showing two multi-layered flexible spargers 100, 200 and an impeller 306, according to some embodiments of the disclosure. The multi-layered flexible spargers 100, 200 show the drilled holed 112 and the port 204. The ports 204 can be supplied by the ports 304, or other ports, which are outside the bioreactor 300.

Figure 7:
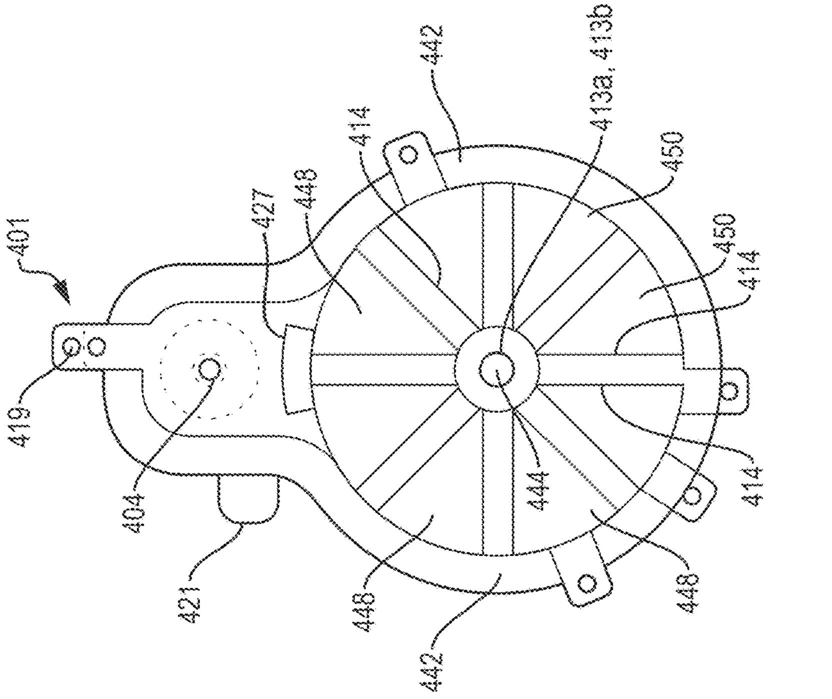
FIG. 7 depicts a top view of a multi-layered sparger having optional locating tabs, according to some embodiments of the disclosure.

FIG. 7 depicts a top view of a multi-layered sparger 400 having optional locating tabs, according to some embodiments of the disclosure. The multi-layered sparger 400 comprises the radial legs 414 adjacent each of the eight flow pockets 448 and around the perimeter bond 442 of an outer border and of a central bond 413*a*, 413*b* area. The radial legs 414 are bonded areas. The bonds are formed within two or more of the layers of the multi-layered sparger 400. In some embodiments, the radial legs 414 are bonds that bond all layers of the multi-layered sparger 400. The multi-layered sparger 400 comprises drilled holes 450 in at least the top layer (discussed below). The drilled holes 450 may also be in the middle layer (discussed below). In some embodiments, the drilled holes 450 have sizes between 5 microns to 1000 microns or any size therebetween. For the sake of simplicity, the drilled holes 450 are depicted in one of the eight flow pockets 448. It is to be understood that the drilled holes 450 may be present in all of the flow pockets 448. It is to further be understood that the drilled holes 450 may be of varied sizes within the same flow pocket 448. In some embodiments, the total hole area, a function of the number of drill holes 450 and size of the drill holes 450, in the middle film layer is less than the total hole area in the top film layer, such that back pressure is created.

As shown, the multi-layered sparger 400 has an arcuate perimeter. The central bond 413*a*, 413*b*, in some embodiments, forms a central hole 444. The central hole 444, which is optional, can be used for locating, joining, releasably attaching, etc., the multi-layered sparger 400 onto, for example, a post within a bioreactor (not shown). A port 404 is shown in a flange 401. The flange 401 is formed from one or more of the layers forming the multi-layered sparger 400. A bond 427 is also shown, which is between all five layers. As shown below, the bond 427 does not necessarily comprise a material in all five layers. For example, a window 417, as discussed below, is present in some layers in some embodiments. Also, in some embodiments, a tab 421 is optionally disposed within the multi-layered sparger 400.

Figure 8A:
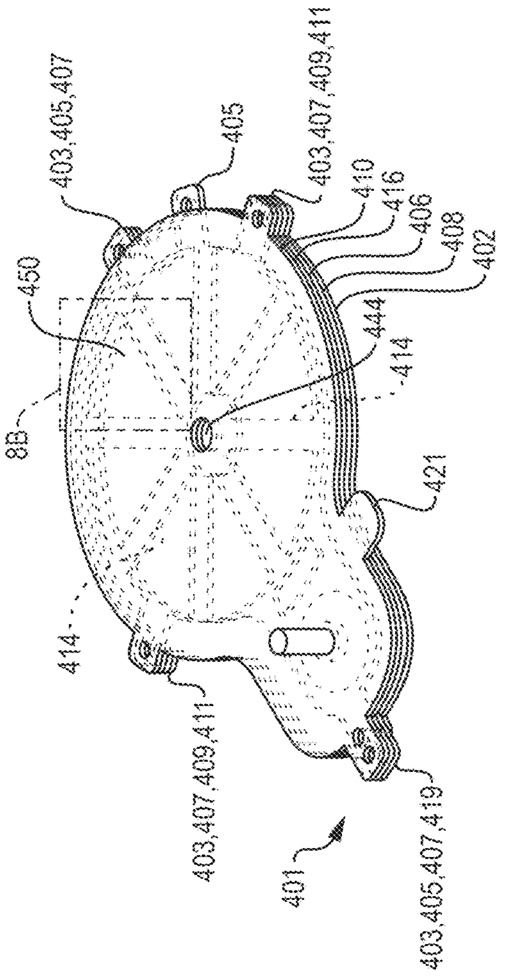
FIG. 8A depicts a top perspective view of the multi-layered sparger of FIG. 7.
Figure 8B:
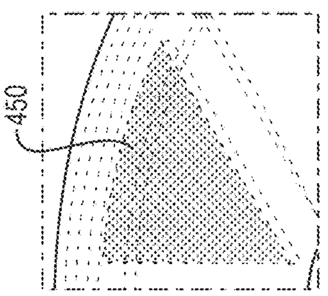
FIG. 8B depicts a close up view of the drill holes in the top film layer of the multi-layered sparger of FIG. 7.

FIG. 8A depicts a top perspective view of the multi-layered sparger 400 of FIG. 7. In some embodiments, the first inner mesh 408 and second inner mesh 416 have a smaller, diameter than a diameter of the flexible sparger 400 so that a bottom film layer 402, a middle film layer 406 and a top film layer 410 can be bonded along a perimeter. In some embodiments, as shown, the first inner mesh 408 and the second inner mesh 416 have a diameter the same as the bottom film layer 402, the middle film layer 406 and the top film layer 410. As shown, the first inner mesh 408, the second inner mesh 416, the bottom film layer 402, the middle film layer 406 and the top film layer 410 comprise a central hole 444*a*, 444*b*, and 444*c* to form the central hole 444 of the multi-layered sparger 400. The multi-layered sparger 400 optionally comprises various tabs on the perimeter of the multi-layered sparger 400. For example, the bottom, middle, and top film layers 402, 406, 410 comprise optional tabs 403, 407, 409, 411, which can be used to locate the layers during manufacturing, e.g., joining, welding, etc. Similarly, the first inner mesh 408 and the second inner mesh 416 may also comprise tabs. FIG. 8B depicts a close up view of the drill holes in the top film layer of the multi-layered sparger of FIG. 7. For simplicity purposes, the drill holes 450 are shown in one section of the top film layer 410. It is to be understood that all eight sections or any combination of sections may have the drill holes 450. Also, as noted above, the middle film layer 406 may comprise drill holes 450 (not shown in this view) in all sections or any combination thereof.

Figure 9:
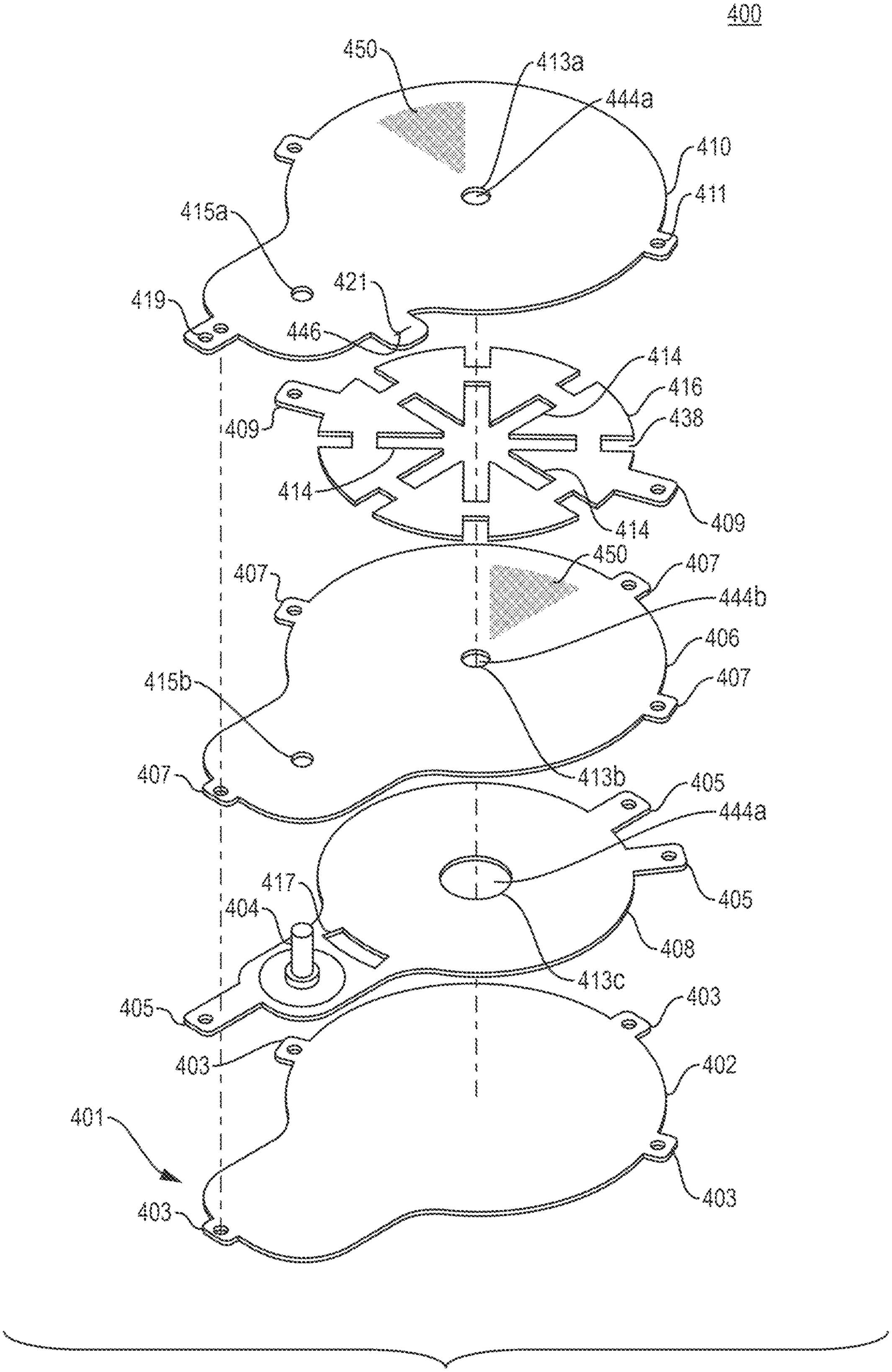
FIG. 9 depicts an exploded view of the multi-layered sparger of FIG. 7.

FIG. 9 depicts an exploded view of the multi-layered sparger of FIG. 7. A bottom film layer 402 comprises a flange 401, and tabs 403. As can be seen, the hole 444*b* in middle film layer 406 has a smaller diameter than the diameter of the hole 444*c* in the first mesh layer 408. The larger diameter of the hole 444*c* contributes to creating a stronger bond between the bottom layer 402 and the middle layer 406. The tab 419, which optionally comprises two holes, can be used both to locate the top film layer 410 during manufacturing and to attach to a post or other feature of a bioreactor bag. The first mesh layer 408 also comprises a central bond 413*c* area, a central hole 444*c* and tabs 405. The middle layer 406 also has port 404 attached thereto. It is to be understood that during joining, the port 404 maybe joined to the middle layer 406 before joining with the other layers, e.g., the top layer 410 or, alternately, the port 404 may be joined, e.g., RF welded, to all layers simultaneously. The first mesh layer 408 further comprises, optionally, a window 417. The window 417 is a cutout from the first mesh layer 408 allowing easier bonding of the bottom film layer 402 to the middle layer 406. The middle film layer 406 comprises tabs 407, the central bond 413*b* area, and the hole 444*b*. Also shown are drill holes 450 in one portion of the middle film layer 406 though it is understood that all portions of the middle film layer 406 may comprise drill holes 450. As shown, the drill holes 450 are shown in one section of the top film layer 410. It is to be understood that all eight sections or any combination of sections may have the drill holes 450. Also, as noted above, the middle film layer 406 may comprise drill holes 450 in all sections or any combination thereof.

A port hole 415*b* allows the port 404 to penetrate therethrough during assembly. The second mesh layer 416 comprises tabs 409 and the radial legs 414. As shown, the radial legs 414 are cutouts from the second mesh layer 416. The second mesh layer optionally comprises perimeter cutouts 438, which may promote bonding to the adjacent layers, e.g., the middle film layer 406 and the top film layer 410. The top film layer comprises the drill holes 450, which deliver a gas(es) to a biological fluid during bioprocesses. The top film layer 410 further comprises the central bond 413*a* area, which surrounds the post hole 444*a* and a port hole 415*a*. The top film layer 410 further comprises a tab 419 having two holes for locating or for anchoring to a bioreactor. The top film layer 410 further comprises tabs 411 and optionally tab 421. Also, the tab 421 may comprise an optional slit 446, which can be used for tube management, i.e., a gas supply tube that is connected with the port 404. A gas delivered into the multi-layered sparger 400 via the port 404 travels between the bottom film layer 402 and the middle film layer 406, around the first mesh layer 408. From there, the gas can travel through the drill holes 450 in the middle film layer 406, into the eight flow pockets 448, and through the drill holes 450 in the top film layer 410 into the fluid within the bioreactor bag.

Figure 10:
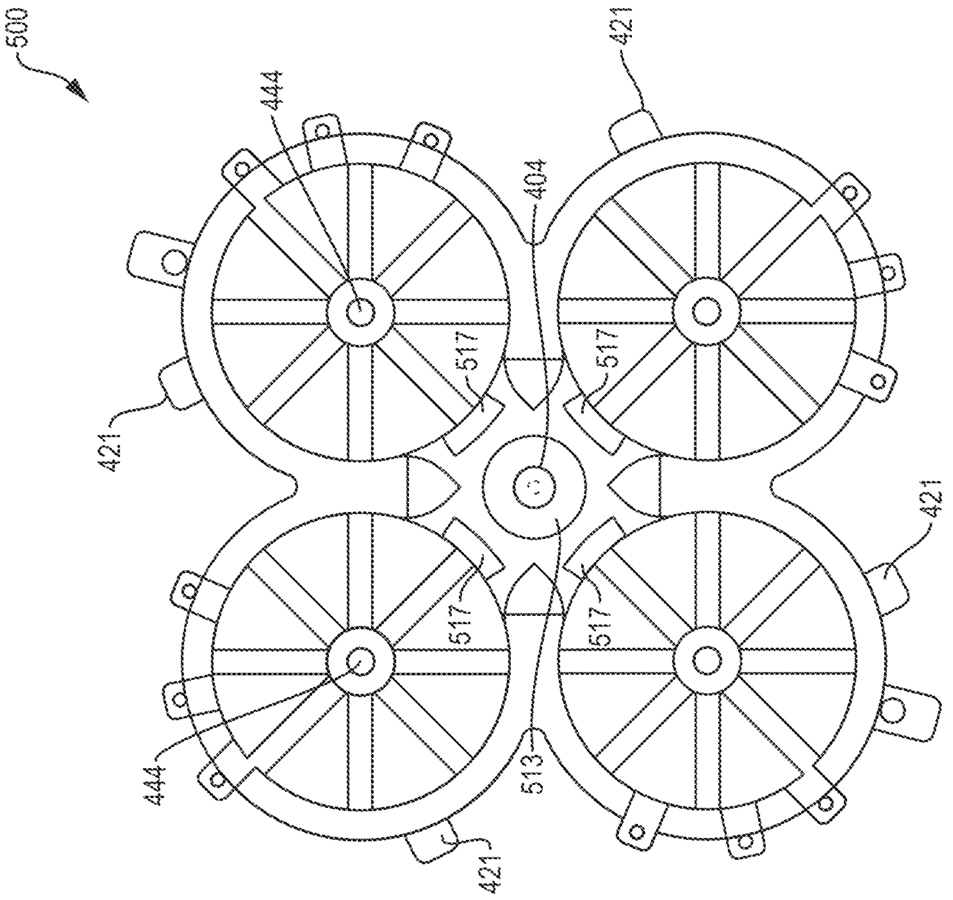
FIG. 10 depicts a top view of a multi-zone, multi-layered sparger having optional locating tabs, according to some embodiments of the disclosure.

FIG. 10 depicts a top view of a multi-zone, multi-layered sparger 500 having optional locating tabs, according to some embodiments of the disclosure. The multi-zone, multi-layered sparger 500 is similar to the multi-layered sparger 400, discussed above. The multi-zone, multi-layered sparger 500 is four of the multi-layered spargers 400 having unitary layers. In other words, the multi-zone, multi-layered sparger 500 has similar materials, layers, and features as the multi-layered sparger 400. The multi-zone, multi-layered sparger 500 comprises a central port 504, surrounded by a central area 513, the port 504 feeding gas to thirty-two pockets 448, and eight pockets 448 within each of four sparging zones. As shown, the central port 504 is on first mesh layer 408. However, this is for convenience. In practice, the central port 504 is disposed on the first mesh layer 408 during assembly. The central port 504 may be attached to the middle film layer 406 by heatstaking or otherwise bonding. Alternatively, the five layers may be stacked with the central port 504 disposed therebetween and the entire assembly is bonded, e.g., by RF welding. As can be seen, the central area 513 also comprises four bonds 517, wherein the bonds are formed over windows, similar to the windows 417 discussed above. The multi-zone, multi-layered sparger 500 also optionally comprises one or more tabs 421 for tube management. Each of the four sparging zones also optionally comprises a central hole 444 for joining with the bioreactor bag. It is to be understood that any reasonable number of sparging zones can be employed within a sparger. For example, two, three, four, five, six, seven, or eight sparging zones.

Figure 11:
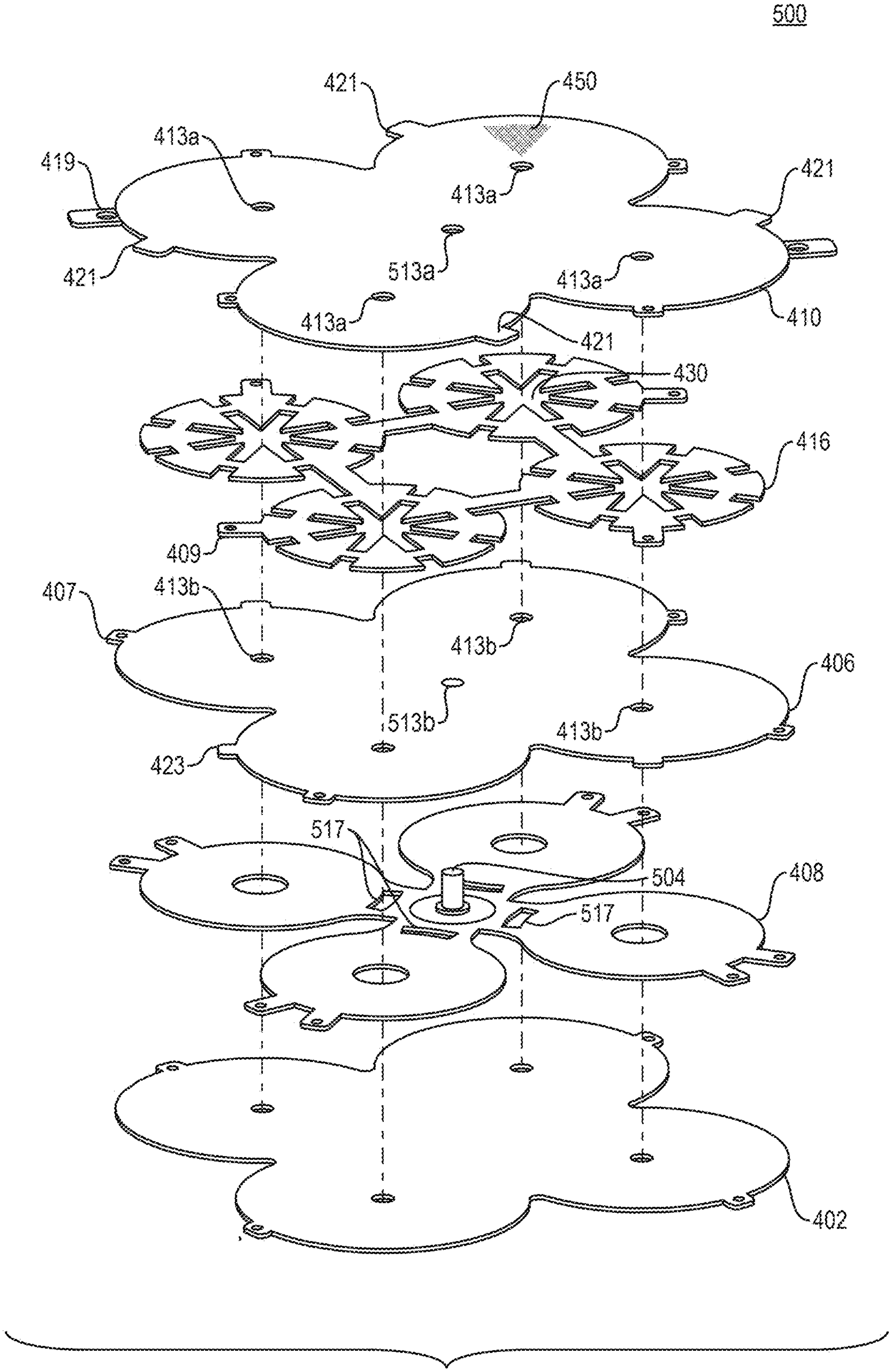
FIG. 11 depicts an exploded view of the multi-zone, multi-layered sparger of FIG. 10.

FIG. 11 depicts an exploded view of the multi-zone, multi-layered sparger 500 of FIG. 10. In some embodiments, as above, the first inner mesh 408 and second inner mesh 416 have a smaller diameter than a diameter of the multi-zone, multi-layered sparger 500 so that a bottom film layer 402, a middle film layer 406 and a top film layer 410 can be bonded along a perimeter, which bonded are three layers together and any other layers, e.g., first inner mesh 408 and second inner mesh 416. In some embodiments, as shown, the first inner mesh 408 and the second inner mesh 416 have a diameter the same as the bottom film layer 402, the middle film layer 406 and the top film layer 410. As shown, the first inner mesh 408, the second inner mesh 416, the bottom film layer 402, the middle film layer 406 and the top film layer 410 comprise a central hole 513, which can be used to house a port 504. The holes 413 can be used, one or all, to releasably join the sparger 500 to a bioreactor. As above, the multi-zone, multi-layered flexible sparger 500 can comprise drill holes 450 in the middle film layer 406 are from 10-800 microns in diameter. The multi-zone, multi-layered flexible sparger 500 may comprise drill holes 450 in the top film layer 410 that are from 10-800 microns in diameter. The multi-zone, multi-layered flexible sparger 500 may comprise drill boles 450 in the middle film layer 406 that are larger than the drill holes 450 in the top film layer 410. The multi-layered flexible sparger 500 may comprise drill holes 450 in the middle film layer 406 that are between 50-800 microns and the drill holes 450 in the top film layer 410 that are 20 microns. The multi-zone, multi-layered flexible sparger 500 may comprise a middle film layer 406 comprising between 80-800 drilled holes and a top film layer 410 comprising between 4000-144,000 drilled holes. In some embodiments of the multi-zone, multi-layered flexible sparger 500, the total hole area, a function of the number of drill holes 450 and size of the drill holes 450, in the middle film layer 406 is less than the total hole area in the top film layer 410, such that back pressure is created. The multi-zone, multi-layered flexible sparger 500 further comprising a bond around a perimeter of the multi-layered flexible sparger 500.

In addition, some embodiments of the flexible sparger(s) may be designed to have differing number of sections and section shapes, depending on a tilt of bioreactor, pressure needs, and/or drilled hole configuration(s). In some embodiments, the woven or extruded mesh, embossed and/or apertured film, or membrane placed between two bonded pieces of laser- or needle-perforated film, woven or extruded mesh, or membrane enables the even distribution of gas flow to maximize gas transfer to achieve a high kLa. The bubble size produced by the flexible sparger can be controlled using more or less open areas (areas open to gas flow) between mesh(es) and/or film layers. Additionally, bubble size can be controlled by employing differing shapes, e.g., open areas in the shape or profile of crosses, slots, and/or crooks. Patterns and spacing (density) of open areas can be adjusted to optimize kLa for gas requirements of bioprocesses. Gas velocity has been identified as a significant factor for kLa Patterns and spacing of open areas of either mesh or perforated film are driven by gas velocity calculations for a range of flow rates. Calculated gas velocity from patterns and spacing of open areas and maximum flow rate allow for scalable solution(s) from 50-2000 L bioreactor sizes based on keeping constant velocity and maximum flow rate(s) of the bioreactor system.

A total sparging area of the flexible sparger can be varied to suit specific flow requirements (which is, for example, cell density driven), resulting in consistent bubble velocity across ranges of air or gas flow. In some embodiments, multiple spargers (or a single flexible sparger comprising multiple sections) can be manufactured from a single set of film sheets. In some embodiments, one or more sections of the flexible sparger are not utilized at low gas flow rates. A partial seal maintains separation between sparging sections at low flow rates and ruptures at higher gas flow rates, allowing consistent bubble velocity across gas flow ranges by increasing the total sparging area.

Some embodiments of the disclosure described herein comprise means of switching between spargers having different pore sizes and kLa performance, which depend on gas flow ranges/requirements, that uses computerized bioreactor control platform by utilizing new mass flow controllers, a new manifold, and a new control scheme. Having multiple spargers having different bubble sizes produces different kLa performance. Having multiple options for kLa performance allows precise control for specific cell lines. Flexible sparger design allows for optimizable shape and placement in a bottom of bioreactor bag to improve kLa. Some embodiments of the flexible sparger(s) allow for proper aeration of a fluid sample while creating a homogenous environment without negatively, via shear or significant foaming, impacting the fluid contents of the vessel.

Gas velocity is identified as a significant factor for kLa. Patterns and spacing of open areas of either mesh or perforated film are driven by gas velocity calculations for a range of flow rates. In certain cell lines, high bubble velocity may be a cause of shear, and it is recommended to keep gas velocity below 30 m/s operating range. In order to keep cells safe for a majority of cell lines and to have the highest performance possible, some embodiments of the flexible spargers are designed around a constant gas velocity at the maximum flow rate of the bioreactor system. For higher performing flexible spargers, a lower flow rate may be used to determine shear limit, rather than maximum flow rate of the system.

$$\text{Gas Velocity} = \frac{\text{Flow Rate}\left(\frac{m^3}{s}\right)}{\text{Open Area}\,(m^2)},$$

where m is meters and s indicates seconds.

Within the above gas velocity equation, the open area of the sparger is defined by the area of each drilled hole multiplied by the number of holes defined by spacing and pattern of drilled holes in sparging area Calculating gas velocity and defining drilled hole pattern according to constant 30 m/s at maximum flow for the system has several benefits such as identifying a predictable kLa performance and a strategy for scalability. For example, rather than scaling up by changing hole size and therefore bubble size, scalability is performed using velocity calculations, so the number of holes and the size of holes may be chosen for each scale depending on performance limits and constant velocity. This proved successful in scaling drilled hole spargers.

Figure 12:
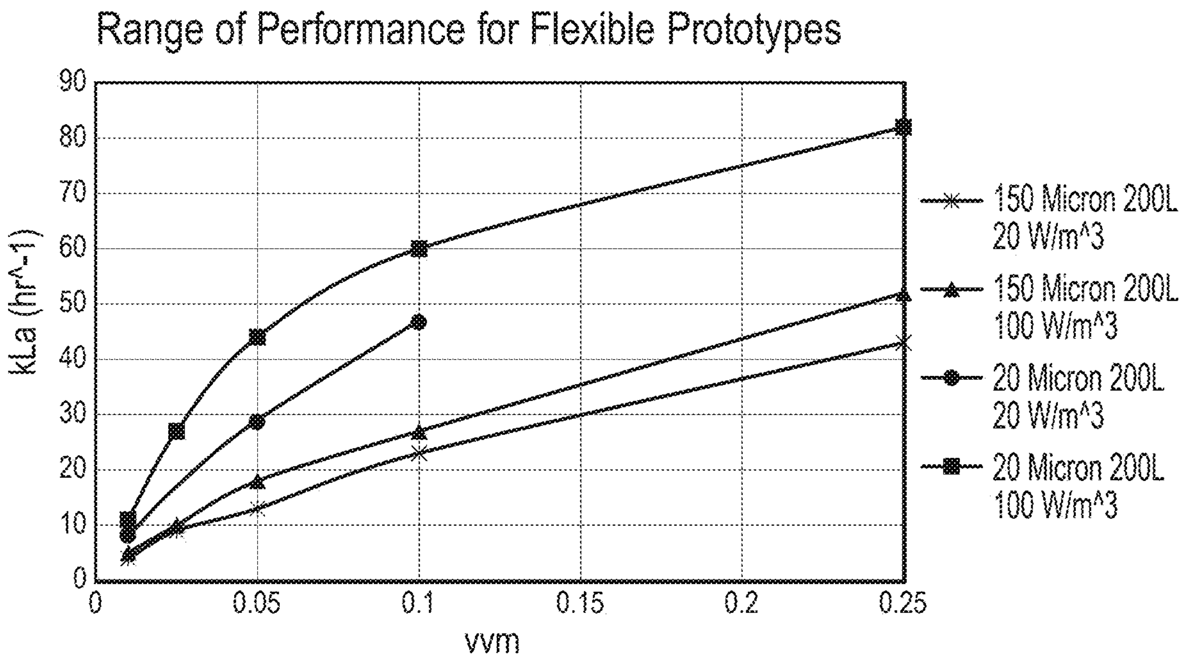
FIG. 12 depicts a graph of the comparative data of the range of performance for four 200-liter flexible spargers, according to embodiments of the disclosure.

FIG. 12 depicts a graph that shows comparative data for four 200-liter flexible spargers, according to embodiments of the disclosure.

FIG. 13 depicts a graph that shows comparative data for flexible spargers for 200-liter and 2000-liter bioreactors, according to embodiments of the disclosure. The maximum flow rate of the system is plotted against kLa, as defined herein. For the 200 L bioreactor systems, a range from 0-50 SLPM is shown, e.g., 50 SLPM is 100% of maximum flow rate. As can be seen, the performance curves of higher performing sparger at high power (i.e., a best case) and lower performing sparger at low power (i.e., a worst case) are substantially similar for both scales of 200 and 2000 L. Outcome produced predictable, scalable kLa between sizes. Scaling may also be done by number of holes and changing sparging area for other bioreactor sizes rather than number of spargers each with constant areas. A flow rate could be increased for larger bioreactors, e.g., >1000 L or, alternatively, the number of flexible spargers in concert with a specified flow rate could be increased.

FIG. 14 depicts a graph that shows comparative data for novel multi-layered flexible spargers, according to embodiments of the disclosure herein, versus molded spargers, wherein a flow rate (standard liters per minute (SLPM)) is plotted against kLa in a 200 L bioreactor. Flexible spargers may risk performance by lack of air distribution and unable to hold down sparging material properly. However, it is to be noted that the performance(s) of embodiments of the novel multi-layered flexible spargers, according to embodiments described herein, is comparable or superior to molded spargers, wherein the flexible spargers are more easily manufactured and packaged. Furthermore, some embodiments comprise drilled holes having sizes between 5 microns to 1000 microns or any size therebetween. In some embodiments, the drilled holes are between 20 microns and 800 microns in diameter. In some embodiments, the drilled holes are between 20 microns and 150 microns and any diameter therebetween. In some embodiments, the drilled holes are between 70 microns and 150 microns and any diameter therebetween. In some embodiments, the drilled holes are between 150 microns and 500 microns and any diameter therebetween. In any flexible sparger, the number of drilled holes may be chosen by maintaining constant the velocity air. Also, the size of the drilled holes is dependent on the shear tolerated by any cells in the bioprocess. Specifically, 5 micron drilled holes produce greater shear. Therefore, shear-sensitive cells may process better using a flexible sparger having, for example, 20 micron drilled holes. The two 20 micron curves show 45 kLa at 20 SLPM while the two 150 micron curves show approximately 30 kLa at 20 SLPM.

FIG. 15 depicts a graph that shows updated flexible prototype bubble size analysis. Bubble size (in micrometers) is found to remain constant within standard deviation regardless of flow rate (as measured by vvm). For example, 1 vessel volumes per minute (vvm) (L/L/m) means in 1 minute there is 1 liter of air passing through 1 liter of medium. Accordingly, a constant and predictable bubble size is known and maintained.

It is also to be understood that another advance over other spargers is via determination that keeping an open area constant can be employed to determine how many holes to use irrespective of whether larger or smaller drilled holes are employed, and, therefore, scalability. Furthermore, for larger bags or bioreactors, e.g., 2000 L, more spargers, for example, four, five or six spargers may be used as opposed to using a single sparger having larger holes.

FIG. 16 depicts a graph that is useful for choosing a number of holes (from 0 to 8000 holes) for a flexible sparger design based off of a velocity limit for air flow of 30 m/s for various hole sizes, ranging from 10-800 micron hole sizes for different embodiments of flexible spargers. From left to right, the curves shown are 800 microns, 150 microns, and 20 microns in diameter.

FIG. 17 depicts a graph that is useful for specifying the number of spargers that might be used for a 200 L bioreactor and a 2000 L bioreactor at a specified air flow velocity. One sparger could be used for a 200 L bioreactor at an air flow of 30 m/s. To keep velocity constant at 30 m/s, four spargers used at 2000 L scale, or increasing the sparging area to have four times the number of holes. In some embodiments, a plurality of spargers is employed, e.g., 2-8 spargers.

During bioprocessing, several modes of operation are possible. For example, sparging into bioreactors, e.g., single use bioreactors, can include continuous gas flow modes, a recipe mode or feedback control loops through software and microprocessors, a manual operation of flow rates, and/or a designation of specific spargers by use of valve manifold. It is to be further understood that some bioprocesses can include two or more of these sparging modes.

All ranges recited herein include ranges therebetween and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries. (or ranges) starting at integer values at the recited order of magnitude or one lower. For example, 3 or more includes 4, or 3.1 or more.

Reference throughout this specification to "one embodiment," "certain embodiments," "one or more embodiments," "some embodiments," or "an embodiment" indicates that a feature, structure, material, or characteristic described in connection with the embodiment is included in at least one embodiment of the disclosure. Therefore, the appearances of the phrases such as "in one or more embodiments," "in certain embodiments," "in one embodiment," "some embodiments," or "in an embodiment" throughout this specification are not necessarily referring to the same embodiment. Nonetheless, it is to be understood that any feature described herein can be incorporated within any embodiment(s) disclosed herein. Publications of patent applications and patents and other non-patent references, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

The invention claimed is:

1. A multi-layered flexible sparger, comprising:

a bottom film layer, a middle film layer, and a top film layer;

a first inner mesh disposed between the bottom film layer and the middle film layer;

a second inner mesh disposed between the middle film layer and the top film layer; and a port capable of delivering a gas to the multi-layered flexible sparger disposed between the top film layer and the bottom film layer, wherein the middle film layer comprises drill holes and the top film layer comprises drill holes.

2. The multi-layered flexible sparger of claim 1, further comprising bonds between the bottom film layer and the middle film layer, and bonds between the top film layer and the middle film layer.

3. The multi-layered flexible sparger of claim 1, further comprising a flange for housing the port.

4. The multi-layered flexible sparger of claim 1, wherein a total area of drill holes in the middle film layer is lower than a total area of drill holes in the top film layer, wherein back pressure is created.

5. The multi-layered flexible sparger of claim 1, wherein the drill holes in the middle film layer are from 10-800 microns in diameter, and the drill holes in the top film layer are from 10-800 microns in diameter.

6. The multi-layered flexible sparger of claim 1, wherein the drill holes in the middle film layer are larger than the drill holes in the top film layer.

7. The multi-layered flexible sparger of claim 1, wherein the drill holes in the middle film layer are smaller than the drill holes in the top film layer.

8. The multi-layered flexible sparger of claim 1, wherein the drill holes in the middle film layer are lower quantity than the drill holes in the top film layer.

9. The multi-layered flexible sparger of claim 1, wherein the middle film layer comprises between 20-200 drilled holes and the top film layer comprises between 1000-36,000 drilled holes.

10. The multi-layered flexible sparger of claim 1, further comprising:

a bond around a perimeter of the multi-layered flexible sparger that bonds the top film layer, the middle film layer, and the bottom film layer;

a central bond in a center of the multi-layered flexible sparger, wherein the central bond is formed from the top film layer through the middle film layer and includes the bottom film layer; and at least two radial bonds extending from a central bond to a perimeter bond and from the top film layer and the middle film layer, wherein two flow pockets are created.

11. The multi-layered flexible sparger of claim 1, wherein the drill holes comprise profiles of crosses, slots, and/or crooks.

12. The multi-layered flexible sparger of claim 1, further comprising a spot bond in at least one flow pocket.

13. A bioreactor system, comprising:

a bioreactor; and the multi-layered flexible sparger of claim 1 disposed therein.

14. A multi-zone, multi-layered, flexible sparger, comprising:

a bottom film layer, a middle film layer, and a top film layer;

a first inner mesh disposed between and bonded to the bottom film layer and the middle film layer;

a second inner mesh disposed between and bonded to the middle film layer and the top film layer; and a port capable of delivering a gas to at least two sparging zones within the multi-zone, multi-layered flexible sparger disposed between the top film layer and the bottom film layer, wherein the middle film layer comprises drill holes and the top film layer comprises drill holes.

15. The multi-zone, multi-layered, flexible sparger of claim 14, comprising four sparging zones, wherein the port is in a center of the four sparging zones.

16. The multi-zone, multi-layered flexible sparger of claim 14, wherein the drill holes in the middle film layer are from 10-800 microns in diameter, and the drill holes in the top film layer are from 10-800 microns in diameter.

17. The multi-zone, multi-layered flexible sparger of claim 14, wherein the drill holes in the middle film layer are larger than the drill holes in the top film layer.

18. The multi-zone, multi-layered flexible sparger of claim 14, wherein the middle film layer comprises between 80-800 drilled holes and the top film layer comprises between 4000-144,000 drilled holes.

19. The multi-zone, multi-layered flexible sparger of claim 14, further comprising a bond around a perimeter of the multi-layered flexible sparger.

20. The multi-zone, multi-layered flexible sparger of claim 14, wherein a total area of drill holes in the middle film layer is lower than a total area of drill holes in the top film layer, wherein back pressure is created.

* * * * *